Patented May 20, 1930

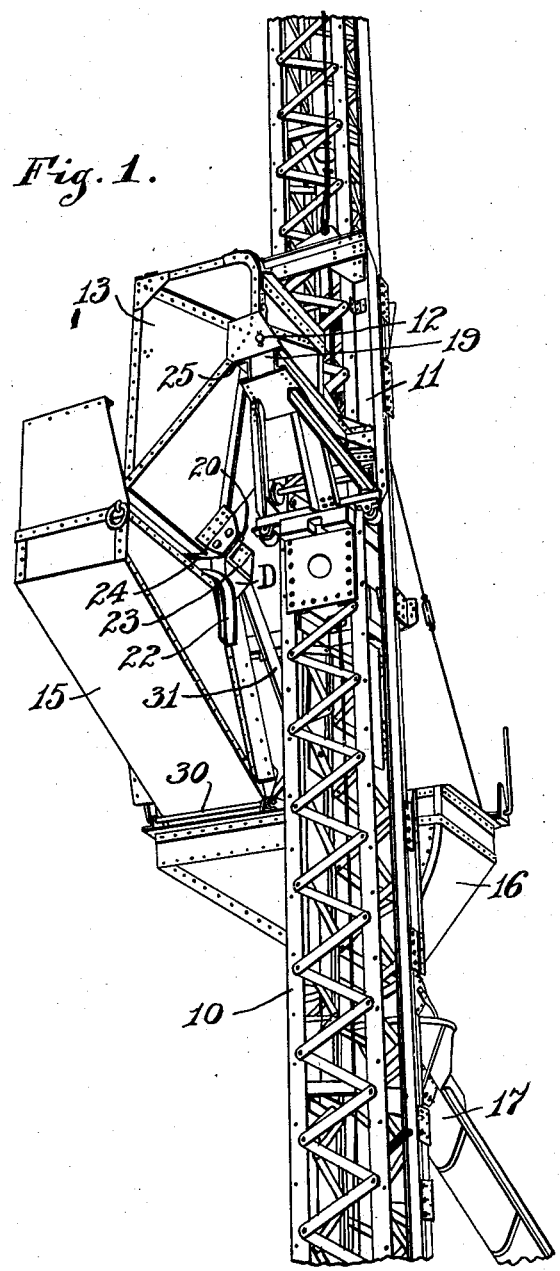

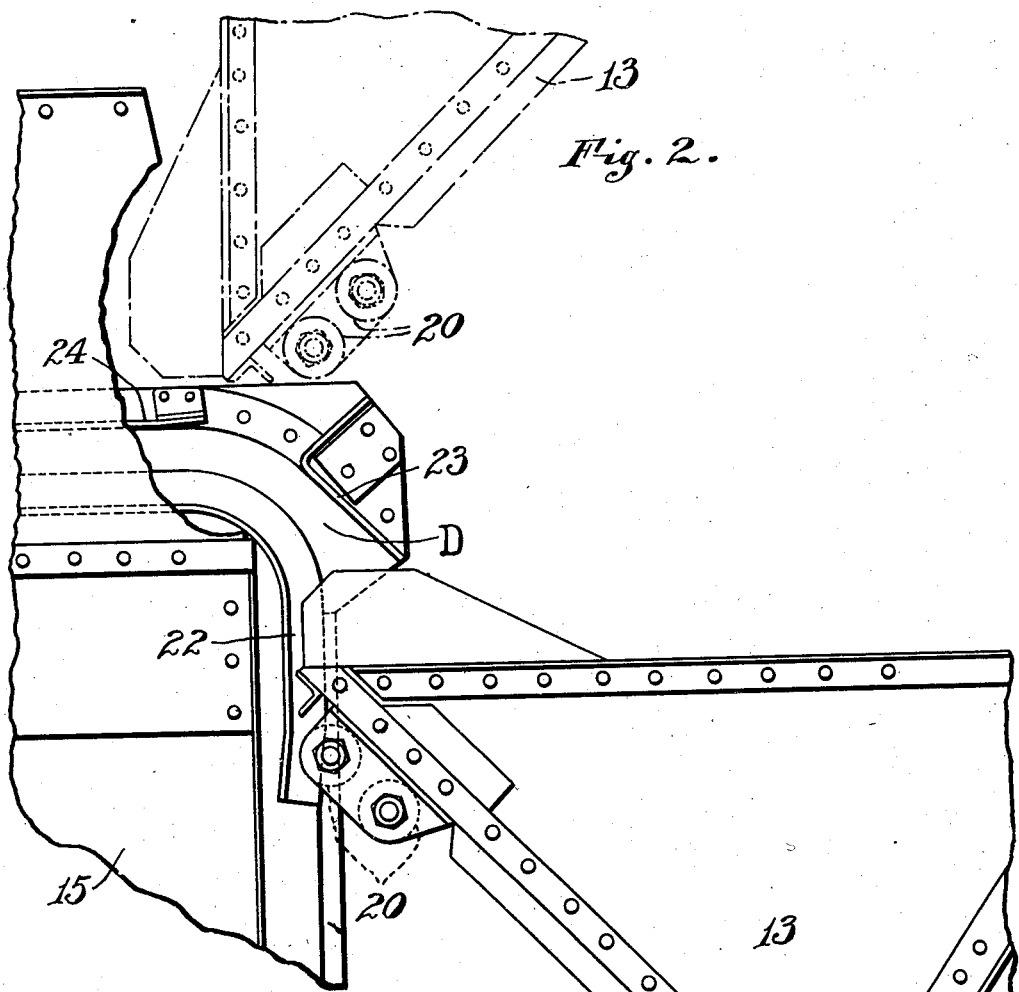
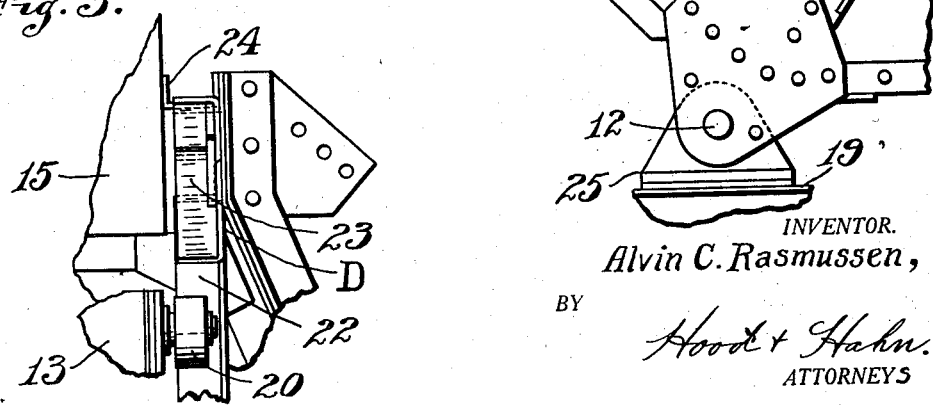

1,759,324

UNITED STATES PATENT OFFICE

ALVIN C. RASMUSSEN, OF INDIANAPOLIS, INDIANA, ASSIGNOR TO INSLEY MANUFACTURING COMPANY, OF INDIANAPOLIS, INDIANA, A CORPORATION OF INDIANA

BUILDING-MATERIAL-HOISTING APPARATUS

Application filed June 16, 1926. Serial No. 116,335.

In many building operations at the present time the building materials are hoisted to an appropriate height by means of a hoist apparatus which is vertically movable along the outside of a central mast, as distinguished from an elevator structure within a tower.

Principal among these building materials is mush concrete which is elevated in a tilting bucket, which, at an appropriate height, is automatically tilted in order to discharge its load into a receiving hopper from which it flows, through appropriate chutes, to the point of deposit.

The object of my present invention is to provide a construction by means of which the tilting bucket may be automatically dumped, at an appropriate discharge height, the dumping being accomplished by mechanism of a character which renders it unnecessary for the operator to approach the dumping position at a limited speed, thereby permitting a materially faster operation than has heretofore been possible.

The accompanying drawings illustrate my invention. Fig. 1 is a perspective view of a fragmentary portion of the central machine, a receiving hopper, portions of the chute system, the hoisting carriage, the tilting bucket and my improved tilting mechanism; Fig. 2 a fragmentary side elevation of my improved dumping mechanism and associated parts, and Fig. 3 a fragmentary elevation of the dumping guide and associated parts.

In the drawings 10 indicates the central mast upon which is vertically reciprocable a carriage 11 upon which is pivoted, on the horizontal axis 12, a tilting bucket 13 which delivers to a vertically adjustable hopper 15. Hopper 15 delivers, in turn, to a hopper 16, vertically adjustable upon that face of machine 10 which is opposite the face upon which carriage 11 slides, and hopper 16 delivers to the receiving end of a chute system 17.

In order that the bucket 13 may be automatically inverted and reverted, without special care on the part of the operator in causing the carriage 11 to approach the dumping position, I have provided the following mechanism:

The bucket, in load-carrying position is normally slightly unbalanced towards the right (Fig. 2), resting upon the support 19, and at one of its upper discharge corners I provide a pair of rollers 20.

Secured to hopper 15 is the discharge guide "D" which comprises a bent track 22 having vertical and horizontal arms. Spaced from track 22, between that track and the line of travel of pivot 12, is a V-shaped track 23, its two arms being directed downwardly and inwardly and upwardly and inwardly respectively. Overlying the horizontal portion of track 22 and vertically spaced therefrom a distance a little greater than the diameter of rollers 20 is a track 24, said track being spaced from the apex of the V-shaped track 23 a sufficient amount to permit the passage of rollers 20. Downward or dumping movement of bucket 13 is limited by the support 19 at the edge 25 (Fig. 2).

The operation is as follows: As bucket 13 rises through the position shown in full lines in Fig. 2, rollers 20 first come opposite the vertical arm of track 22, then come into engagement with the downwardly and inwardly inclined portion of track 23, by which the bucket is caused to tilt downwardly, as its pivot point continues to rise and, when the bucket has been carried to its inverted position, rollers 20 passing in between the horizontal arm of track 22 and the overlying track 24, continued rise of the pivot point of the bucket permits rollers 20 to pass upwardly through the gap between tracks 23 and 24, the bucket remaining in its inverted load-discharging position so that, no matter how far upwardly, beyond hopper 15, the bucket may be carried, it will continue to discharge into hopper 15.

On the downward movement of carriage 11 rollers 20 come first into contact with the upwardly and downwardly inclined arm of track 23 and are thus projected through the gap between said track and track 24 and into contact with track 22 and, as the carriage continues to descend, the bucket will be returned to its load-receiving and carrying position.

By reason of this construction the operator may approach the dumping position at full speed and permit the bucket to pass upbeyond its initial dumping position, without possibility of injury to the construction.

The hopper 15 is pivoted at 30 to hopper 16 and braced by braces 31, the arrangement being such that, in shifting hopper 16 vertically, the hopper 15 may be swung through an angle of about forty-five degrees over upon hopper 16 so as to clear the guy wires which brace the mast.

I claim as my invention:

1. In a hoisting apparatus the combination with a vertically movable carrier, a tilting bucket carried thereby and normally biased toward non-dumping position, a pair of rollers mounted one behind the other at the mouth of said bucket, and a tilting guide arranged in the vertical path of movement of said rollers, such guide being of such form as to engage the rollers to carry the bucket to inverted position without obstructing continued upward movement of the bucket after inversion and engaging said rollers in the downward movement of the bucket to move the same back to normal position.

2. In a hoisting apparatus the combination of a supporting structure, a vertically movable carriage thereon, a tilting bucket mounted on said carriage and normally biased in non-dumping position, a pair of rollers mounted one behind the other at the mouth of said bucket, a dumping guide mounted on the supporting structure and provided with a V-shaped track having upwardly and downwardly divergent arms arranged in the vertical path of movement of said rollers, and a horizontal guide co-operating with said V-shaped track for causing dumping of the bucket as it is carried vertically upward past said track and said guide at its top being open adjacent the apex of said V-shaped track to permit said rollers to freely pass upwardly beyond said V-shaped track after dumping.

3. In a hoisting apparatus the combination of a supporting structure, a vertically movable carriage thereon, a tilting bucket mounted on said carriage, a pair of rollers arranged one behind the other mounted adjacent the mouth of said bucket, a dumping guide mounted on the supporting structure and provided with a V-shaped track having upwardly and downwardly divergent arms arranged in the vertical path of movement of the aforesaid bucket portion, a pair of horizontally disposed tracks co-operating with said V-shaped track for causing dumping of the bucket as it is carried vertically upward past said track, the upper track being open adjacent the apex of the V-shaped track to permit the rollers to freely pass upwardly beyond said V-shaped track after dumping, said horizontal tracks co-operating with said V-shaped track for righting of the bucket as it is lowered and permit said rollers to freely pass downward past said V-shaped track in righted position.

In witness whereof, I have hereunto set my hand at Indianapolis, Indiana, this 12th day of June, A. D. one thousand nine hundred and twenty-six.

ALVIN C. RASMUSSEN.